US010693995B2

United States Patent
Matsumoto (10) Patent No.: US 10,693,995 B2
(45) Date of Patent: Jun. 23, 2020

(54) MESSAGE EXECUTION SERVER AND CONTROL METHOD

(71) Applicant: CANON KABUSHIKI KAISHA, Tokyo (JP)

(72) Inventor: Tetsuya Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 15/730,546

(22) Filed: Oct. 11, 2017

(65) Prior Publication Data

US 2018/0109648 A1    Apr. 19, 2018

(30) Foreign Application Priority Data

Oct. 14, 2016   (JP) ................................. 2016-202963

(51) Int. Cl.
*G06F 15/177* (2006.01)
*H04L 29/08* (2006.01)
*H04L 12/58* (2006.01)

(52) U.S. Cl.
CPC ............ *H04L 67/325* (2013.01); *H04L 51/26* (2013.01); *H04L 67/322* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 2011/0205585 A1* | 8/2011 | Mihara | ................ | G06F 3/1203 358/1.15 |
| 2011/0299112 A1* | 12/2011 | Ota | ....................... | G06F 3/1211 358/1.15 |
| 2012/0086978 A1* | 4/2012 | Uchikawa | ............ | G06F 3/1212 358/1.15 |
| 2012/0120441 A1* | 5/2012 | Kaneko | ................ | H04L 41/069 358/1.15 |
| 2015/0378794 A1* | 12/2015 | Sato | ....................... | G06F 9/546 719/328 |
| 2016/0234129 A1* | 8/2016 | Konoura | ............... | H04L 47/781 |

FOREIGN PATENT DOCUMENTS

JP           2015-072716 A       4/2015

* cited by examiner

*Primary Examiner* — Phyllis A Book
(74) *Attorney, Agent, or Firm* — Canon U.S.A., Inc. IP Division (57) ABSTRACT

A message execution server executes a process based on a message, which is registered in a queue by a message registration server. The message execution server acquires a message from the queue, executes the process based on the acquired message, and registers, to the queue, a message of a remained process based on the message which is interrupted when a predetermined period of time passes after the process based on the acquired message is executed. To the registered message, a delay time, which indicates a period of time to make the registered message unavailable from the queue, is set.

9 Claims, 10 Drawing Sheets

| PROCESS ID | DIVIDING UNIT | NUMBER OF PIECES OF DATA PER PROCESS | UNIT DELAY TIME |
|---|---|---|---|
| Import Logs | NUMBER OF LOGS | 1000 | 3 min |
| Export Logs | NUMBER OF DATES | 10 | 10 min |
| Delete Data | NUMBER OF TENANTS | 1 | 0 min |
| ... | ... | ... | ... |

FIG. 6

| TENANT ID | PROCESS ID | MESSAGE ID | STATE |
|---|---|---|---|
| Tenant A | Import Logs | Message 5 | PROCESS COMPLETED |
| Tenant A | Export Logs | Message 2-1 | PROCESSING |
| Tenant A | Export Logs | Message 2-2 | WAITING TO BE PROCESSED |
| Tenant A | Export Logs | Message 2-3 | WAITING TO BE PROCESSED |
| ... | ... | ... | ... |
| Tenant A | Export Logs | Message 2-10 | WAITING TO BE PROCESSED |
| Tenant B | Export Logs | Message 4 | PROCESSING |
| Tenant C | Export Logs | Message 7 | WAITING TO BE PROCESSED |
| ... | ... | ... | ... |

FIG. 7

TENANT ID: Tenant A
PROCESS ID: Export Logs
MESSAGE ID: Message 2-2
TARGET DATA: 1000-2000

| PROCESS ID 1101 | INTERRUPTION TIME 1102 |
|---|---|
| Aggregate Data | 10 min |
| Create Report | 5 min |
| ... | ... |

FIG. 12

| 601 | 602 | 603 | 604 | 1201 |
|---|---|---|---|---|
| TENANT ID | PROCESS ID | MESSAGE ID | STATE | PROGRESS STATUS |
| Tenant A | Import Logs | Message 5 | COMPLETED | |
| Tenant A | Export Logs | Message 2 | PROCESSING | PROCESS COMPLETED FROM JUNE 1ST TO JUNE 7TH |
| Tenant B | Export Logs | Message 4 | PROCESSING | |
| Tenant C | Export Logs | Message 7 | WAITING TO BE PROCESSED | |
| ... | ... | ... | ... | ... |

MESSAGE EXECUTION SERVER AND CONTROL METHOD

BACKGROUND OF THE INVENTION

Field of the Invention

The present disclosure relates to a message execution server that executes a process based on a message in a queue, and a control method.

Description of the Related Art

As a service that provides various applications operating in a server on the Internet, there is a cloud service. In a cloud service such as IaaS and PaaS, a cloud service vender provides a system administrator resources including a virtual machine that operates in a server computer in a data center over the Internet or a storage. The virtual machine is a logical computer that divides, using a virtual technique, the server in logical units without considering its physical configuration and operates with an independent operating system provided in the respective divided server. The system administrator can establish a system to provide an original service by using the resources including the virtual machine and the storage, which are provided by the cloud service vender.

In the system established by using the cloud service, a message queue (hereinafter, referred to as a queue) may be used to execute a process data asynchronously or periodically. In the queue, a message corresponding to process target data is stored. The virtual machine having a function to process the message acquires the message stored in the queue and executes a process according to a process content described in the message.

Japanese Patent Laid-Open No. 2015-72716 describes a mechanism to control to increase or reduce a number of instances that execute a process based on a message, according to a number of messages stored in a queue.

In a system that uses the above described queue, the time needed for the process of one message may differ depending on the process content of the message. Accordingly, there may be a case that the message execution server (instance) is occupied for a long period of time for a process of a message having a long process time and the start of a process of another message registered in the queue is delayed.

In the above described mechanism of Japanese Patent Laid-Open No. 2015-72716, when the number of messages stored in the queue is equal to or greater than a defined value, the number of the instances for executing the process based on the message increases. However, in a case that the process of each message acquired by the instances takes a long period of time, this results in a process of other message which may be delayed.

SUMMARY OF THE INVENTION

Here, it is preferable to provide a condition that a resource of the cloud service is equally allocated to each service user as a transmitter of a request of a message to be registered.

Therefore, embodiments of the present invention provide a mechanism that prevents such an instance from being occupied for a long period of time and executes the processes of the messages in the queue equally as maintaining the registered order for a certain degree.

Embodiments of the present invention provide a message execution server that executes a process based on a message, which is registered in a queue by a message registration server. The message execution server acquires a message from the queue, executes a process based on the acquired message, and registers a message of a remained process to the queue based on a message which is interrupted, when a predetermined period of time passes after the process based on the acquired message is executed. To the message to be registered, a delay time, which indicates a period of time to make the registered message unavailable from the queue, is set.

Further features of the present invention will become apparent from the following description of exemplary embodiments (with reference to the attached drawings).

DESCRIPTION OF THE EMBODIMENTS

In the following, embodiments of the present invention will be described with reference to the drawings.
(First Embodiment)
<System Configuration>

Figure 1:
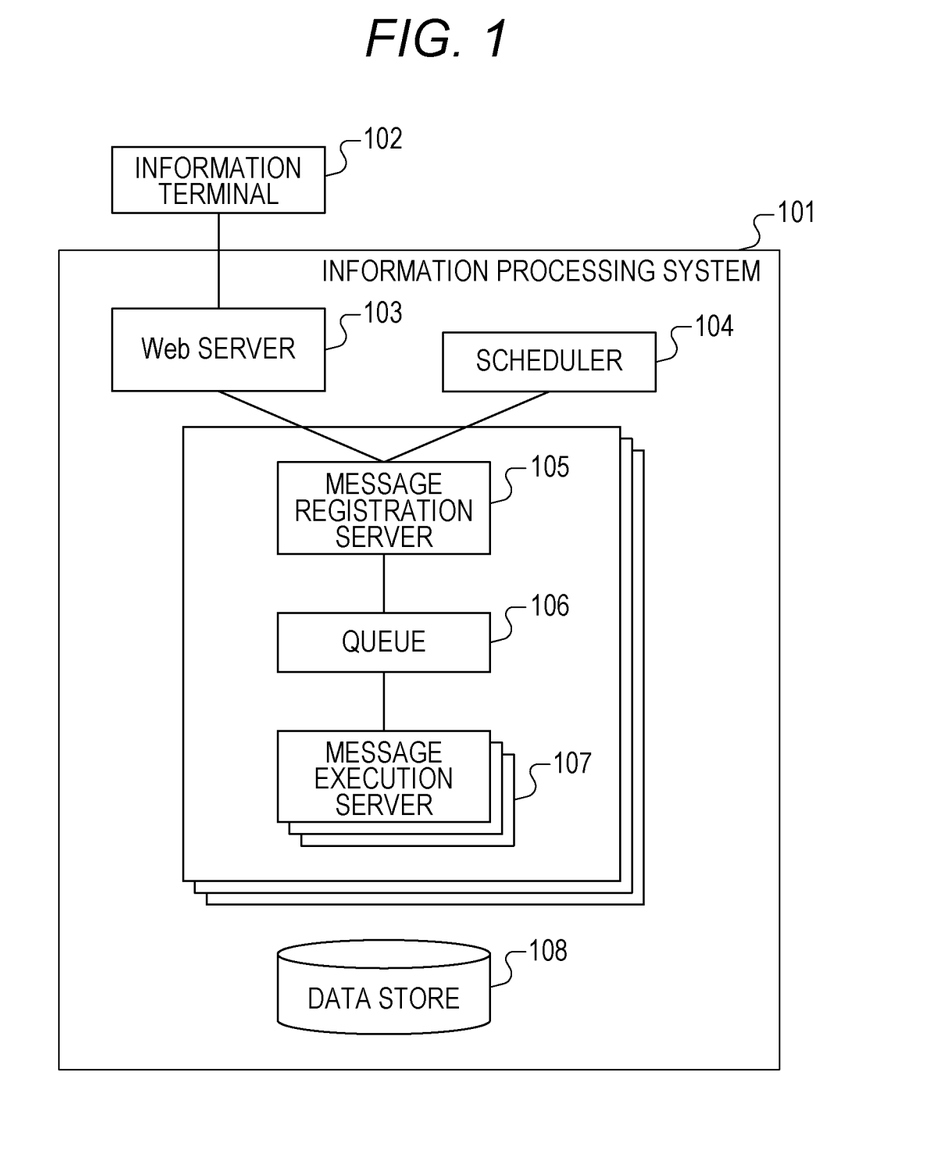
FIG. 1 is a diagram illustrating an example of an overall configuration of a system according to an embodiment of the present invention.

FIG. 1 is a diagram illustrating an example of an overall configuration of a system according to an embodiment of the present invention.

In FIG. 1, an information processing system 101 is a system established by using a platform and a resource provided by a cloud service. The cloud service provides, as a resource, a plurality of virtual machines, a storage, and the like, which work in a server computer in a data center on the Internet for example. A web server 103, a scheduler 104, a message registration server 105, a queue 106, a message execution server 107, and a data store 108 are included. An information terminal 102, the web server 103, scheduler 104, message registration server 105, queue 106, message execution server 107, and data store 108 are communicably connected to one another via a known technique such as the Internet.

The information terminal 102 is a personal computer (PC) or the like and is a terminal used by a user who uses a service provided by the information processing system 101. The user instructs the information processing system 101 to execute a process via a web page provided by the information processing system 101.

The web server 103 provides a web page used by the user to use the service. The web server 103 receives the process execution instruction from the user via the web page. Then, the web server 103 transmits a request of registering a message to execute the process instructed by the user to the message registration server 105.

The scheduler 104 instructs the message registration server 105 to execute a regularly-scheduled process. The regularly-scheduled process is a regularly-scheduled aggregation process of data managed in the information processing system, a regularly-scheduled deletion process, and the like. When it becomes time to execute a previously set regularly-scheduled process, the scheduler 104 transmits, to the message registration server 105, a request to register a message to execute the regularly-scheduled process.

The message registration server 105 generates a message and registers the message to a queue. When receiving a message registration request from the web server 103 or the scheduler 104, the message registration server 105 generates a message and registers the generated message to the queue 106.

The queue 106 stores the message registered by the message registration server 105.

The message execution server 107 acquires the message registered in the queue and executes a process instructed by the message. There is one or more message execution server 107 for a single queue. Here, there may be a configuration that the number of the message execution servers 107 is made increased or reduced according to an increase or a reduction of the number of messages registered in the queue. In the following description, setting to increase or reduce the number of the message execution servers is referred to as auto scale setting.

The data store 108 stores various data managed by the information processing system 101.

Here, a mechanism of the queue 106 will be described. The message stored in the queue is not deleted from the queue by simply acquiring the message from the queue. After completing to process the message by the message execution server, an instruction of deleting the message is performed to the queue and then the message is deleted.

Further, as a function of the queue, there is a function to make a condition that the message in the queue cannot be acquired by another message execution server after the message execution server 107 acquires the message registered in the queue and before a first predetermined period of time passes. Here, the first predetermined period of time is referred to as an invisible time (Visibility Timeout). This state of the message is referred to as an invisible state. This function allows to control so that more than one message execution servers cannot acquire a same message and execute a same process. Here, when an invisible time passes after the message is acquired, the state of the message becomes a visible state in the queue. For example, in a case that the message execution server fails to process the message and then the message becomes in a visible state after the invisible time passes, one of the message execution servers 107 can acquire the message and retry the process.

Further, as another function of the queue, there is a function to switch the state of the message to an invisible state in the queue after the message is registered in the queue and before a second predetermined period of time passes. The second predetermined period of time is referred to as a delay time (Delay Seconds). This function allows to set a period of time to make the message registered in the queue to be in an invisible state. Due to the specification of the queue, first-in first-out processing of the messages is not always ensured. Thus, there may be a case that an acquisition of messages in order of registered in the queue cannot be realized. For example, by setting a delay time to a message in a later stage, the registered order can be surely maintained.

Further, the invisible time and delay time can be set to the queue or to the individual messages. When the invisible time and delay time are set to the queue, the values thereof are used as default values. When the invisible time is set to the queue, it is needed to set a value appropriate in each process with consideration for the time needed to process the message and a retry interval in a case that the process is failed. Further, according to the present embodiment, the delay time (the default value) set to the queue is set as zero. In other words, when a message is registered to the queue without setting an invisible time and a delay time, the invisible time and delay time set to the queue are applied to the message. On the other hand, when the invisible time and delay time are set to the message and registered to the queue, the invisible time and delay time set to the message are used. Here, the invisible time may be updated after the message is registered to the queue. When the invisible time of the message registered in the queue is updated, an updated value is applied from the time of the update. For example, after 20 seconds pass after a message in which the invisible time is set as 60 seconds is acquired and, when the invisible time is updated with the 60 seconds, the message becomes in a visible state after 60 seconds from the updated time.

The present embodiment describes an example that there is one queue 106 for each type of a process executed by the information processing system. For example, the queue that stores a message to execute a data aggregation process and the queue that stores a message to execute a data deletion process are assumed to be different queues. Further, there is a single message registration server 105 for each queue. Thus, the web server 103 and scheduler 104 determine a message registration server as a destination of a message registration request transmission according to the process. Thus, the present embodiment describes an example that there are a plurality of combinations between the message registration server 105, queue 106, and message execution server 107 for each type of a process executed by the information processing system. There may be a configuration that a single queue is used as grouping the process types in appropriate units. Further, there may be a configuration that the message registration servers 105 are aggregated in appropriate units.

<Inner Configuration of Information Processing Device>

Figure 2:
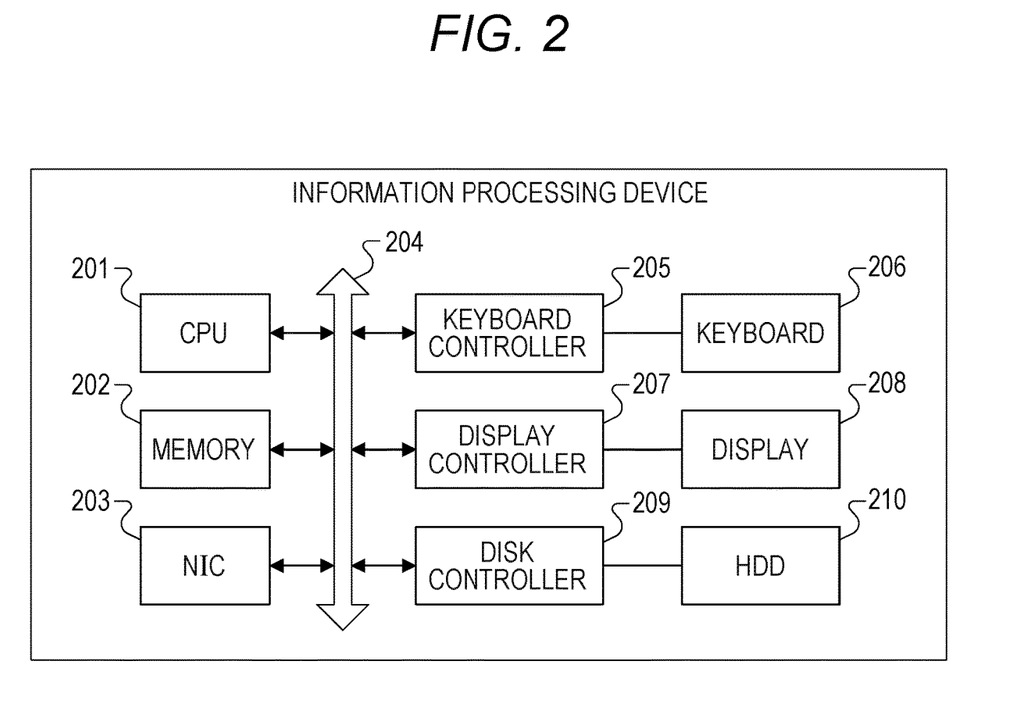
FIG. 2 is a diagram illustrating an example of an inner configuration of an information processing device.

FIG. 2 is a diagram illustrating an example of an inner configuration of the information processing device such as the information terminal 102 or a server computer or the like in a data center in which the information processing system 101 is provided.

The information processing device includes a CPU 201 that executes a software stored in a hard disk drive (HDD) 210 serving as a memory. The CPU 201 integrally controls each hardware connected to a system bus 204.

A memory 202 functions as a main memory, a work area, or the like of the CPU 201.

A network interface card (NIC) 203 transmits and receives data to and from another node via a network.

A keyboard controller 205 controls an instruction input from a keyboard 206 provided to the PC. Here, depending on a role of the information processing device, there may be a configuration that the keyboard controller 205 and keyboard 206 are not provided.

A display controller 207 controls a display of a display module 208, which is composed of a liquid crystal display or the like, for example. Here, depending on a role of the information processing device, there may be a configuration that the display controller 207 and display module 208 are not provided.

A disk controller 209 controls the hard disk drive (HDD) 210, which is a large-capacity storage unit.

<Function Framework of Message Registration Server>

Figure 3:
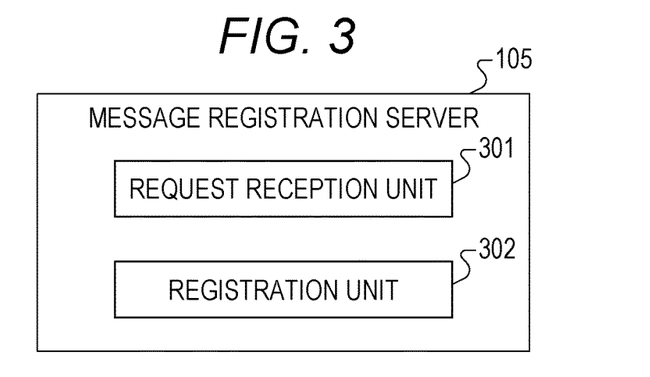
FIG. 3 is a diagram illustrating an example of a function framework of a message registration server 105.

FIG. 3 is a diagram illustrating an example of a function framework of the message registration server 105.

A request reception unit 301 receives a message registration request from the web server 103 or scheduler 104. After receiving the message registration request, a registration unit 302 generates a message of the requested process and registers the message to the queue 106. The detail of the message registration process will be described later.

<Function Framework of Message Execution Server>

Figure 4:
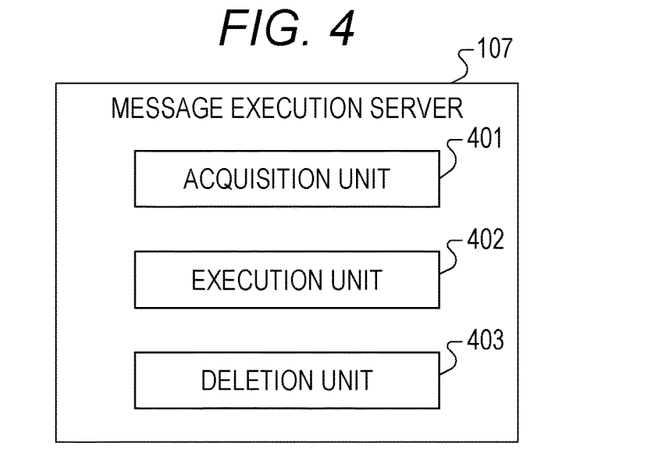
FIG. 4 is a diagram illustrating an example of a function framework of a message execution server 107.

FIG. 4 is a diagram illustrating an example of a function framework of the message execution server 107.

An acquisition unit 401 acquires a message registered in the queue. After acquiring the message, an execution unit 402 executes a process specified by the message. After executing the message, a deletion unit 403 instructs to delete the executed message from the queue. The detail of the message execution process will be described later.

<Division Setting Table>

Figure 5:
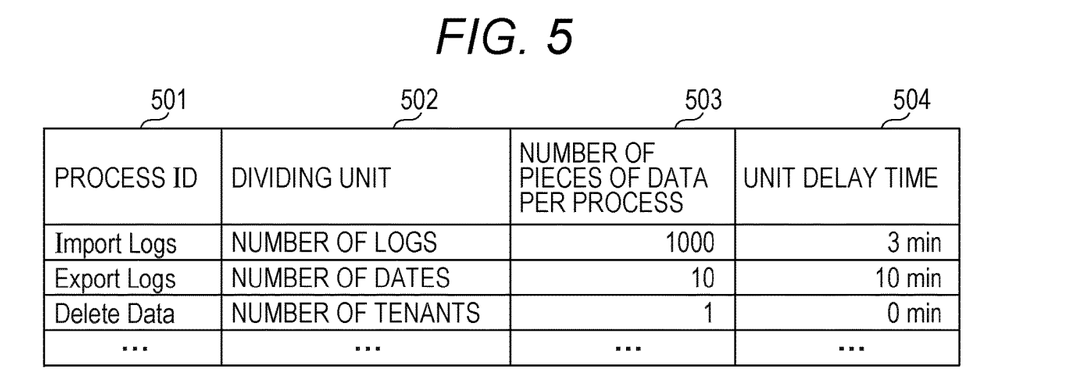
FIG. 5 is a diagram illustrating an example of a division setting table.

FIG. 5 is a diagram of a division setting table illustrating an example of a configuration of division setting information, which is maintained by the data store 108 of FIG. 1 and used in the message registration process. According to the present embodiment, the message registration server 105 generates a message by dividing a requested process in predetermined units and registers the message to the queue. The division setting is setting that indicates how the various asynchronous processes or a regularly-scheduled execution process executed by the information processing system is to be divided.

For example, when a process based on the message is a process to register data to a data base in the system, a process time per one message depends on the number of pieces of data to be registered. Thus, it is needed to set the number of pieces of data to be processed for each message to make the process time of one divided message in a comparable level.

In FIG. 5, the column of 501 is a process ID and indicates an ID that uniquely identifies the various asynchronous processes and regularly-scheduled execution process that the information processing system executes in the system.

The column 502 is dividing unit information, and the column 503 is data piece number information per process and used to divide the process in a predetermined unit. For example, regarding the requested process, when the target log number in a log data import process (Import Data) is 5,000, the process is divided into five in units of log number (dividing unit) of 1,000 (the number of pieces of data per process). Further, regarding the requested process, when the number of target dates in a log data export process (Export Data) is from June 1st to June 25th, the process is divided into three in units of dates (dividing unit) of ten days (the number of pieces of data per process). When the invisible time (default value) set to the queue and auto scale setting are considered, it is preferable that the process time of each message in the queue is equivalent. Thus, the dividing unit information 502 and the data piece number information 503 per process are set so that the process time of each message becomes equivalent.

The column 504 is a unit delay time, and is a unit time used to calculate a delay time set to each divided message. The detail of a delay time calculation method will be described later. Here, regarding the process that the information processing system executes only in back-end and does not affect the user even the process takes time, the unit time is set as zero. Although the detail will be described later, this causes that the delay time set to the message is also zero, and a waste time which may be caused by setting a delay time can be prevented.

<Message Management Table>

Figure 6:
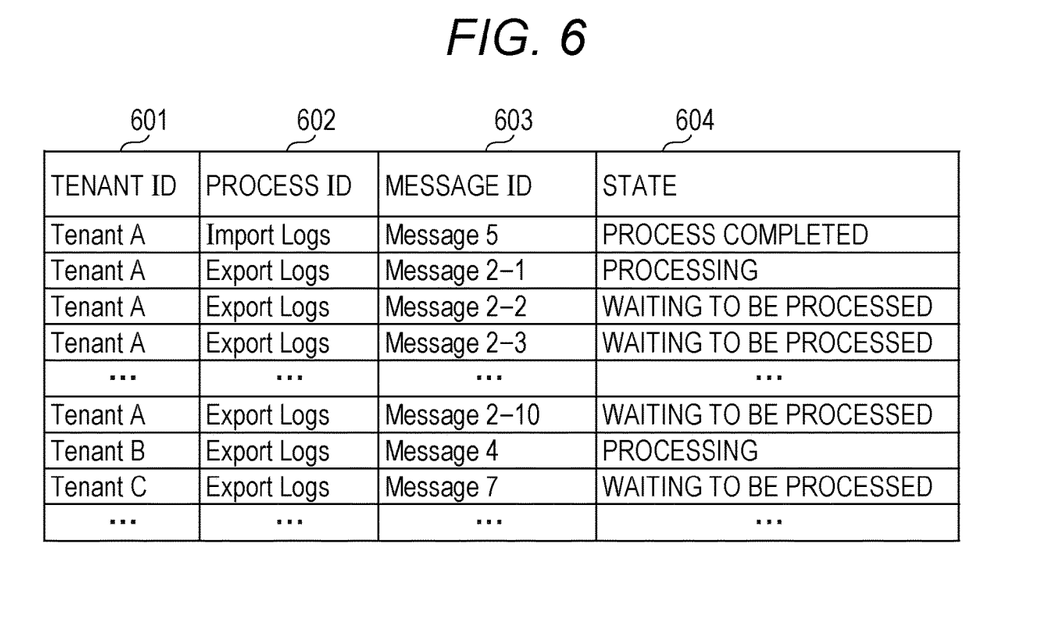
FIG. 6 is a diagram illustrating an example of a message management table.

FIG. 6 is a diagram of a message management table illustrating an example of a configuration of message management information maintained in the data store 108 of FIG. 1 and used in the message registration process and message execution process. The message management table manages information related to each message. A case that a queue to be used is a queue like a distributed queue may result in that more than one message execution server acquire a same message due to the nature of the queue. Even in a case that more than one message execution servers acquire a same message, a state of the message is managed as message information not to execute the same process.

In FIG. 6, the column 601 is a tenant ID. The tenant ID is an ID that uniquely identifies a tenant in the system. This table indicates which tenant's message management information the message management information in a corresponding line is. In the information processing system 101 according to the present embodiment, data of a client using the system is managed in unit of a tenant, which is an area dedicated to the client. The information processing system receives requests from a plurality of clients and processes messages corresponding to the received requests. Thus, for example, in a case that a request is received from the client B after receiving a request from the client A, and the process of the message corresponding to the request from client A takes a long period of time, the client B may have to wait for a response from the information processing system for a long period of time. More specifically, even though the client B has sent a request which process time is short, the client B, which is waiting for a response from the system, may be made to wait for a long period of time without knowing the reason. Thus, the present embodiment describes a mechanism that allows the process of the message corresponding to the request from the client B to cut in the process of the message corresponding to the request from the client A.

The column 602 is a process ID and indicates which process' message management information the message management information of the corresponding line is.

The column 603 is a message ID and indicates an ID that uniquely identifies a message in various processes of each tenant.

The column 604 is state information and indicates a state of the message. In this example, as the state, there are three states including "Waiting to be processed," "Processing," and "Process completed." "Waiting to be processed" indicates a state after a message is registered to the queue and before the message is acquired from the queue and the process starts. "Processing" indicates a state after the process starts and before the process is completed. "Process completed" indicates a state that the process is completed. The state information 604 is registered in a message registration process and updated in a message execution process. In the message execution process, it is controlled to confirm the state of the message after the message is acquired and before executing the process and execute the process only when the state of the message is "Waiting to be processed." With this configuration, a same process is executed even when more than one message execution servers acquire a same message.

<Message>

Figure 7:
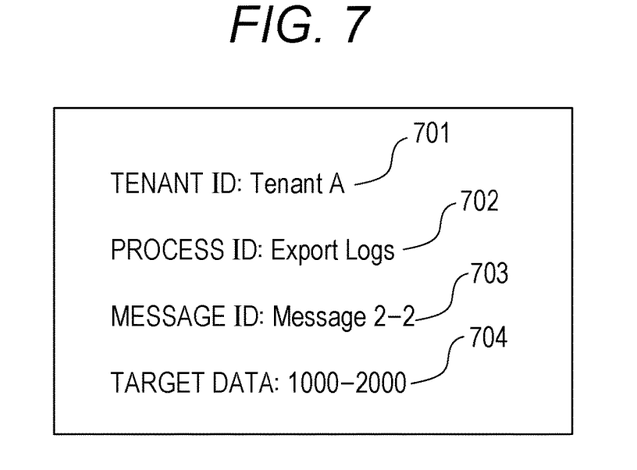
FIG. 7 is a diagram illustrating an example of a message to be registered to a queue.

FIG. 7 is a diagram illustrating an example of a message registered in the queue 106. In the message, information that allows the message execution server 107 to judge the process content is included. The message of this example includes a tenant ID 701, a process ID 702, a message ID 703, and target data 704. The target data 704 indicates data which is a processing target of the message. The tenant ID is an identifier of a tenant that indicates a client as a transmitter of the request.

<Message Registration Process>

Figure 8:
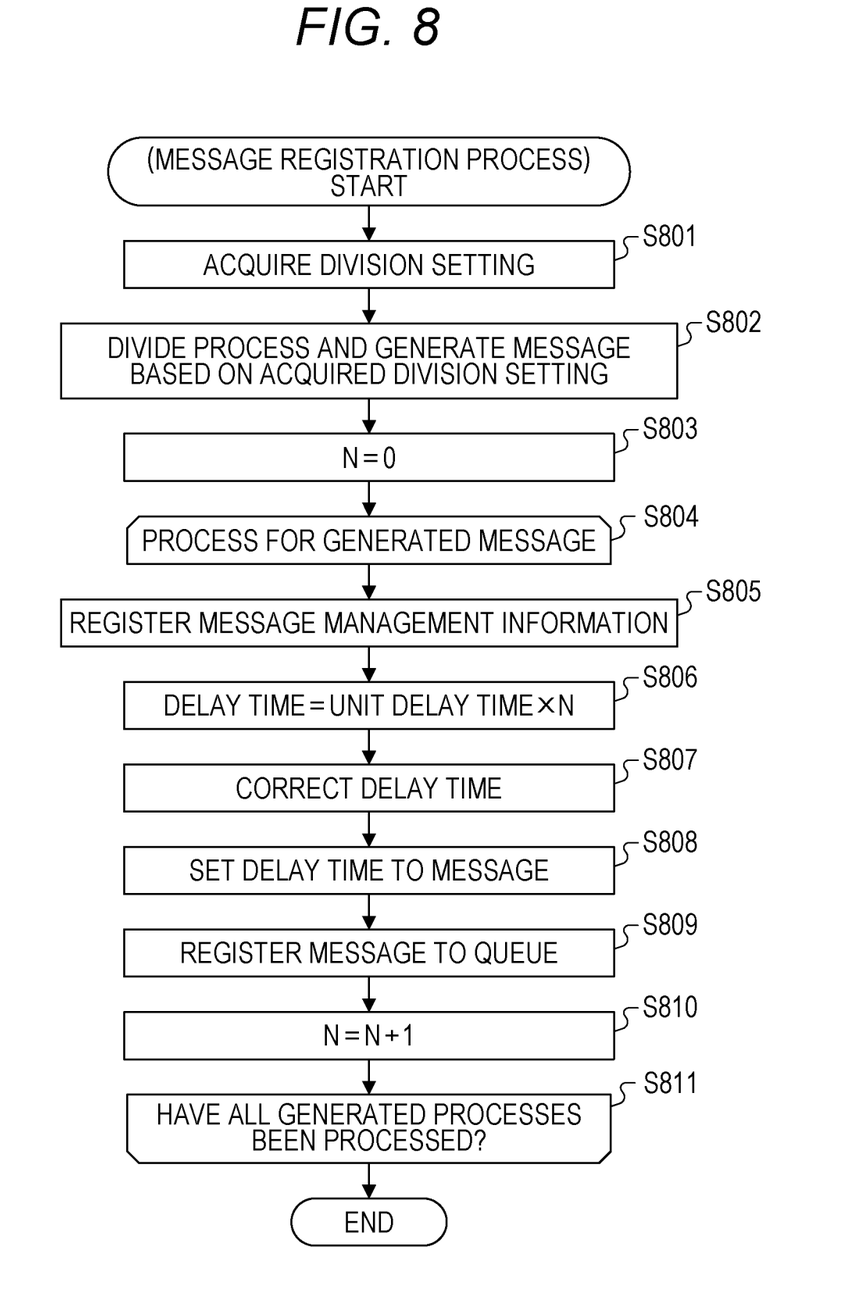
FIG. 8 is a flowchart illustrating an example of a procedure of a message registration process.

FIG. 8 is a flowchart illustrating a procedure example of a message registration process executed by the message registration server 105. This process is a process executed when a message registration request is received from the web server 103 or scheduler 104. In this process, the message instructing a process is decided and a different delay time is set for each message. This process prevents the process for a particular message from occupying the message execution server and allows to process the message efficiently. Further, by dividing the message in predetermined units, auto scaling due to an increase and a reduction of the number of messages registered in the queue can also be performed properly.

The process illustrated in the flowchart of FIG. 8 is realized by that the CPU 201 of the server computer, in which a virtual machine serving as the message registration server 105 operates, reads and executes a program registered in the memory 202, HDD 210, or the like. Here, the following processes illustrated in the flowchart are similarly executed by the CPU 201 of the server computer in which the virtual machine of the corresponding function operates.

When the message registration process is started, in S801, the registration unit 302 acquires division setting corresponding to the requested process.

Next, in S802, the registration unit 302 divides the process and generates messages based on the dividing unit information 502 of the division setting acquired in S801 and the data piece number information 503 per a single process.

Next, in S803, the registration unit 302 assigns zero to N. N is a variable, which is incremented every time when a message generated by being divided is registered to the queue.

Next, in S804, the registration unit 302 repeats the process for one message at a time regarding messages to which the process flow in S804 to S811 is not performed among the messages generated by being divided in S802.

Next, in S805, the registration unit 302 registers message management information of a message which is being processed. Here, the state information 604 of the message management information to be registered is set as "Waiting to be processed."

Next, in S806, the registration unit 302 calculates a delay time set to a message being processed. Here, when a message is divided into more than one messages, the delay times are calculated to be different values for respective divided messages. According to the present embodiment, a value in which current N value is multiplied to the unit delay time 504 is set as a delay time. For example, when a process is divided into five processes, the delay time of the message of the first process is calculated as zero minute, the delay time for the second process is five minutes, the delay time for the third process is ten minutes, the delay time for the fourth process is fifteen minutes, and the delay time for the fifth process is twenty minutes. When these messages are registered to the queue, the five messages become in a visible state (available state) one by one with five-minute intervals. Here, the five divided processes are considered as processes of a tenant A. It is assumed that a message of a process of a tenant B is registered three minutes after the five divided messages of the tenant A are registered. Here, since the process of the tenant B is one message, it is assumed that its delay time is set as zero minute. In this case, the second message of the tenant A is in an invisible state (unavailable state) since the delay time is set to five minutes. Thus, the message execution server firstly acquires the message of the tenant B. In other words, without waiting for the completion of the process of the tenant A, the process of the tenant B can be executed. In this manner, since a message instructing a process is divided and different delay times are set to the respective messages, a process for a particular message does not occupy the message execution server, and the messages can be processed efficiently. It is noted that the delay time of each message may be set with consideration for the order of the divided messages to be processed.

Next, in S807, the registration unit 302 corrects the delay time calculated in S806. As a correction method, it may be considered to correct a delay time based on auto scale setting of the message execution server. In a case that the number of the message execution servers can be increased, the delay time is corrected to be a smaller value. When the delay time becomes smaller, the number of available messages may increase. According to the number of available messages, the number of message execution servers increases and the process efficiency is improved. On the other hand, when the number of message execution servers cannot be increased, the delay time is corrected to be a larger value. When the delay time becomes larger, the number of available messages may not increase and a different message is acquired more easily. As another correction method, it may be considered to correct a delay time based on the message management information. When a same process of a same tenant is waiting to be processed or being processed, the delay time is corrected by adding a predetermined period of time according to the number. When the number of the same processes of the same tenant is larger, delay time becomes larger and a message of another tenant can be acquired more easily. Here, the method to correct a delay time may be omitted.

Next, in S808, the registration unit 302 sets the delay time calculated in S806 and S807 to the message which is being processed.

Next, in S809, the registration unit 302 registers the message being processed to the queue.

Next, in S809, the registration unit 302 assigns a value, in which one is added to N, to N. In other words, the value of N is incremented.

Next, in S804, the registration unit 302 judges whether or not there is a message to which the processes from S804 to S811 are not performed. Here, when the registration unit 302 judges that there is a message to which the processes from S804 to S811 are not performed, the process returns to S804 and repeats the processes. On the other hand, when the registration unit 302 judges that there is no message to which the processes from S804 to S811 are not performed, the process ends.

<Message Execution Process>

Figure 9:
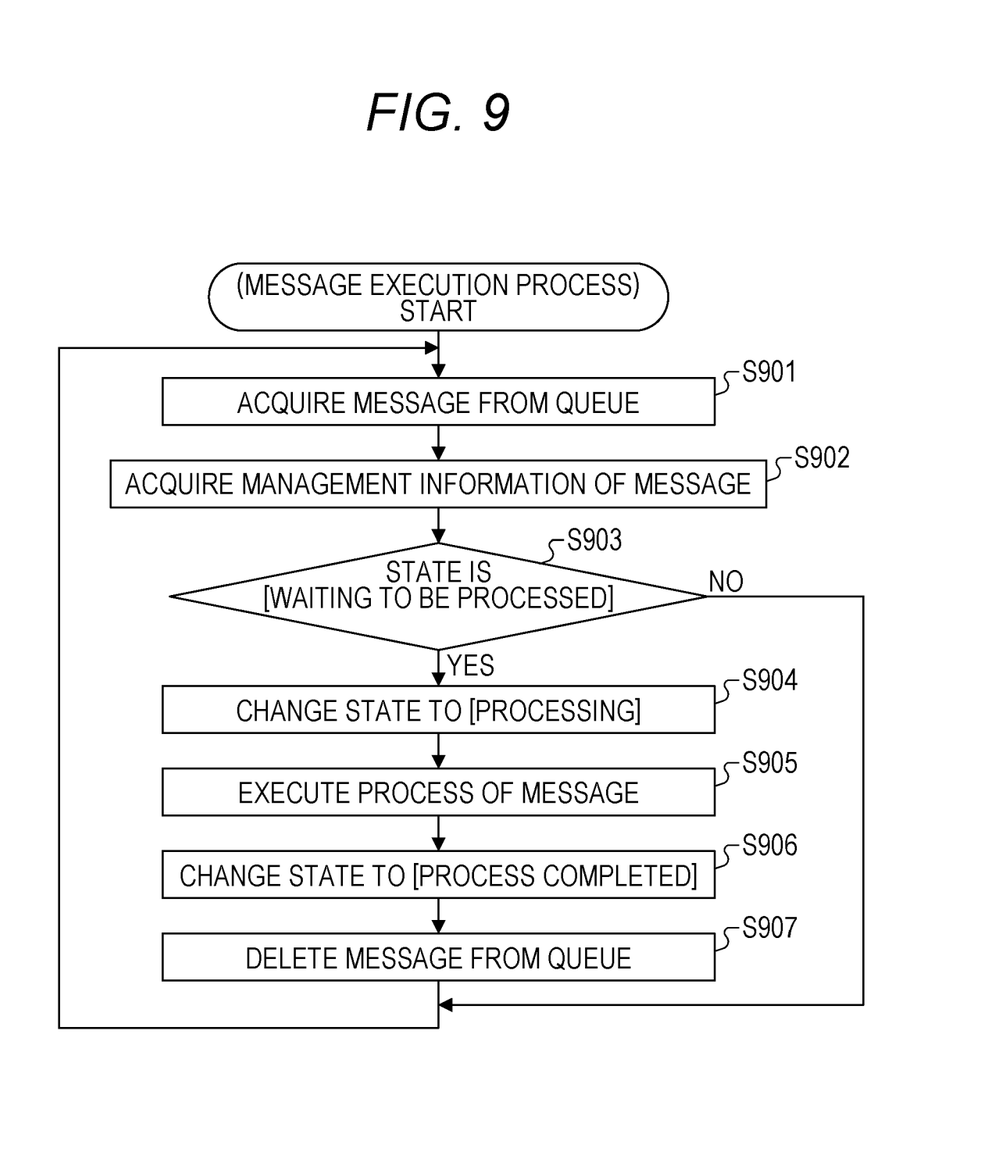
FIG. 9 is a flowchart illustrating an example of a procedure of a message execution process.

FIG. 9 is a flowchart illustrating a procedure of a message execution process executed by the message execution server 107. This process is a process to be executed when the message execution server 107 confirms a message registered in the queue 106 and there is an available message.

When the message execution process starts, in S901, the acquisition unit 401 acquires an available message from the queue.

Next, in S902, the execution unit 402 acquires management information of the message acquired in S901.

Next, in S903, the execution unit 402 judges whether the state information 604 acquired in S901 is "Waiting to be processed" or not. Here, when the execution unit 402 judges that the state information 604 is "Waiting to be processed," the process proceeds to S904. On the other hand, when the execution unit 402 judges that the state information 604 is not "Waiting to be processed," which means that the state information 604 is "Processing" or "Process completed," it is determined that it is not needed to execute the process and the process returns to S901 to process another message.

Next, in S904, the execution unit 402 changes the state information 604 of the message acquired in S901 to "Processing."

Next, in S905, the execution unit 402 executes a process instructed by the message acquired in S901.

Next, in S906, the execution unit 402 changes the state information 604 of the message acquired in S901 to "Process completed."

Next, in S907, the deletion unit 403 deletes the message acquired in S901 from the queue, and the process returns to S901 to acquire another message to process.

According to the present embodiment, when a message of a process having a long process time is registered to the queue, the message registration server generates a plurality of messages by dividing the process and further a different delay times are set to the respective messages. Here, to employ a mechanism described in the present embodiment, the message needs to be divided so that the process load of the message execution server becomes almost equivalent. With the present embodiment, the message execution server is not occupied by a process having a long process time and another message is allowed to cut in.

(Second Embodiment)

According to a second embodiment, another embodiment of the present invention will be described.

The first embodiment has described a method of arranging the process to register a message to a queue. The second embodiment describes a method of arranging the process to acquire and execute a message from a queue.

In the method described in the first embodiment, the requested process needs to be divided. However, there are some processes which cannot be divided. Further, even when the process can be divided, the dividing may cause a complicated problem since a control of an order of executing the divided processes and a control of excluding the execution of the divided processes are needed. The second embodiment describes a mechanism that can process queue messages efficiently as preventing a server from being occupied by a process of a particular queue message even when there is a process which cannot be divided.

It is noted that a difference from the first embodiment will be described.

<Function Framework of Message Execution Server>

Figure 10:
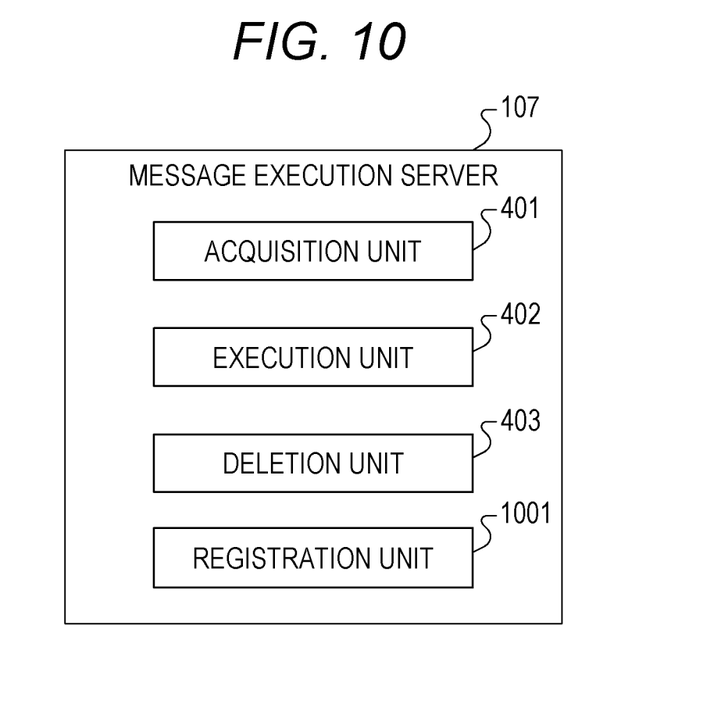
FIG. 10 is a diagram illustrating an example of a function framework of a message execution server 107 according to a second embodiment.

FIG. 10 is a diagram illustrating an example of a function framework of the message execution server 107 according to the second embodiment. The function framework is an expansion of the function framework illustrated in FIG. 4 of the first embodiment.

The reference numerals 401 to 403 are same as what is described in the first embodiment. The reference numeral 1001 is a registration unit, which reregisters a message same as the message acquired by the acquisition unit 401 to the queue or registers, when a process based on the message is interrupted, a message related to only the rest of the process to the queue.

<Division Setting Table>

The second embodiment may have a configuration that does not include the division setting information illustrated in FIG. 5 of the first embodiment.

<Interruption Setting Table>

Figure 11:
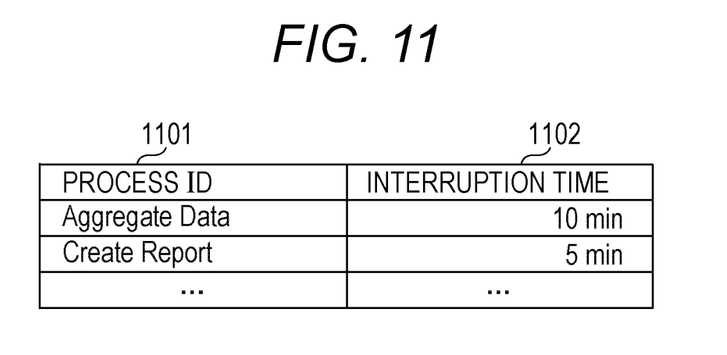
FIG. 11 is a diagram illustrating an example of an interruption setting table.

FIG. 11 is a diagram of an interruption setting table, which illustrates a configuration of interruption setting information stored in the data store 108 illustrated in FIG. 1 and used in the message execution process. According to the present embodiment, in a case that an execution of a process of a message is started and the process does not complete after a predetermined period of time, the message execution server 107 interrupts the process. In the interruption setting, regarding each process executed in the information processing system, time from the start of the execution of a message process until its interruption is managed.

In FIG. 11, the column 1101 is a process ID and indicates an ID that uniquely identifies, in the system, various asynchronous processes and regularly-scheduled execution processes, which are executed by the information processing system.

The column 1102 is an interruption time and indicate the time from the start of an execution of the process of a message until the process is interrupted, regarding the process of a corresponding line. It is preferable that the interruption time is set to a value smaller than an invisible time, and an appropriate value is set considering the time needed to the process of the message and the time that allows a condition that the server is occupied by a particular message.

<Message Management Table>

Figure 12:
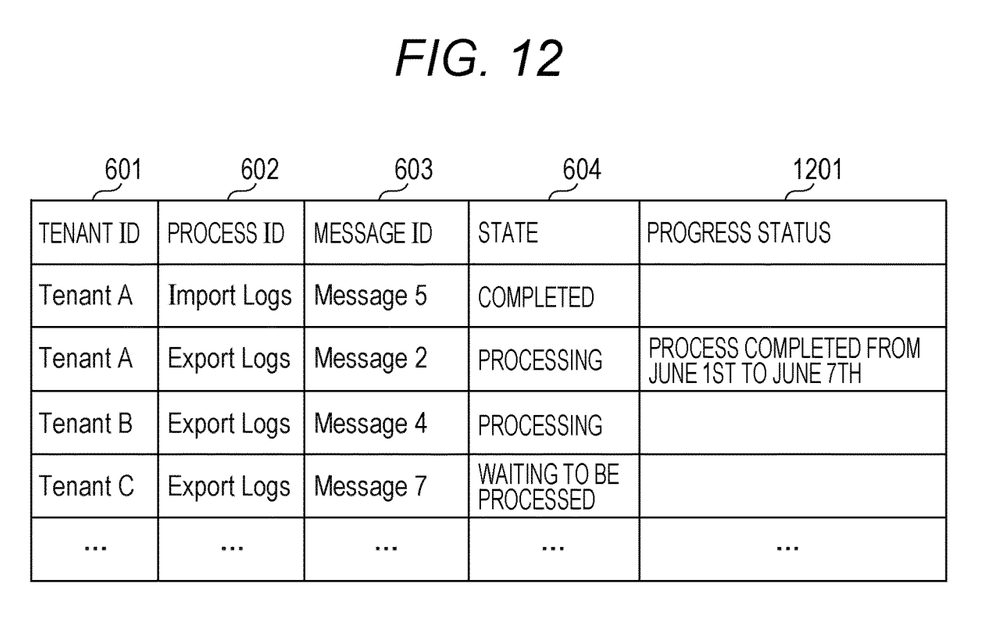
FIG. 12 is a diagram illustrating an example of a message management table according to the second embodiment.

FIG. 12 is a diagram of a message management table and illustrates an example of a configuration of the message management information according to the second embodiment. This configuration is an expansion of the configuration illustrated in FIG. 6 of the first embodiment.

The reference numerals 601 to 604 are the same as what is described in the first embodiment. The column 1201 is progress status information and indicates a progress status of a process of a message of a corresponding line. The progress status 1201 is updated in a message execution process.

<Message Registration Process>

Figure 13:
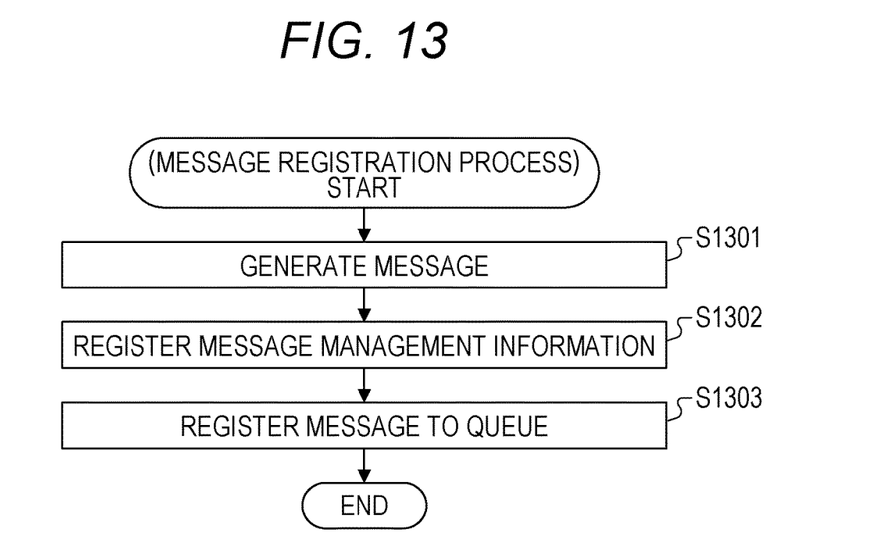
FIG. 13 is a flowchart illustrating an example of a procedure of a message registration process according to the second embodiment.

FIG. 13 is a flowchart illustrating an example of a procedure of a message registration process executed by the message registration server 105 according to the second embodiment. This process is a process in which a process related to dividing a process and setting a delay time is extracted from the message registration process illustrated in FIG. 8 according to the first embodiment.

When the message registration process is started, in S1301, the registration unit 302 generates a message of a requested process.

Next, in S1302, the registration unit 302 registers message management information of the message generated in S1301. Here, the state information 604 of the message management information to be registered is set to "Waiting to be processed."

Next, in S1303, the registration unit 302 registers the message generated in S1301 to the queue and ends the process.

<Message Execution Process>

Figure 14:
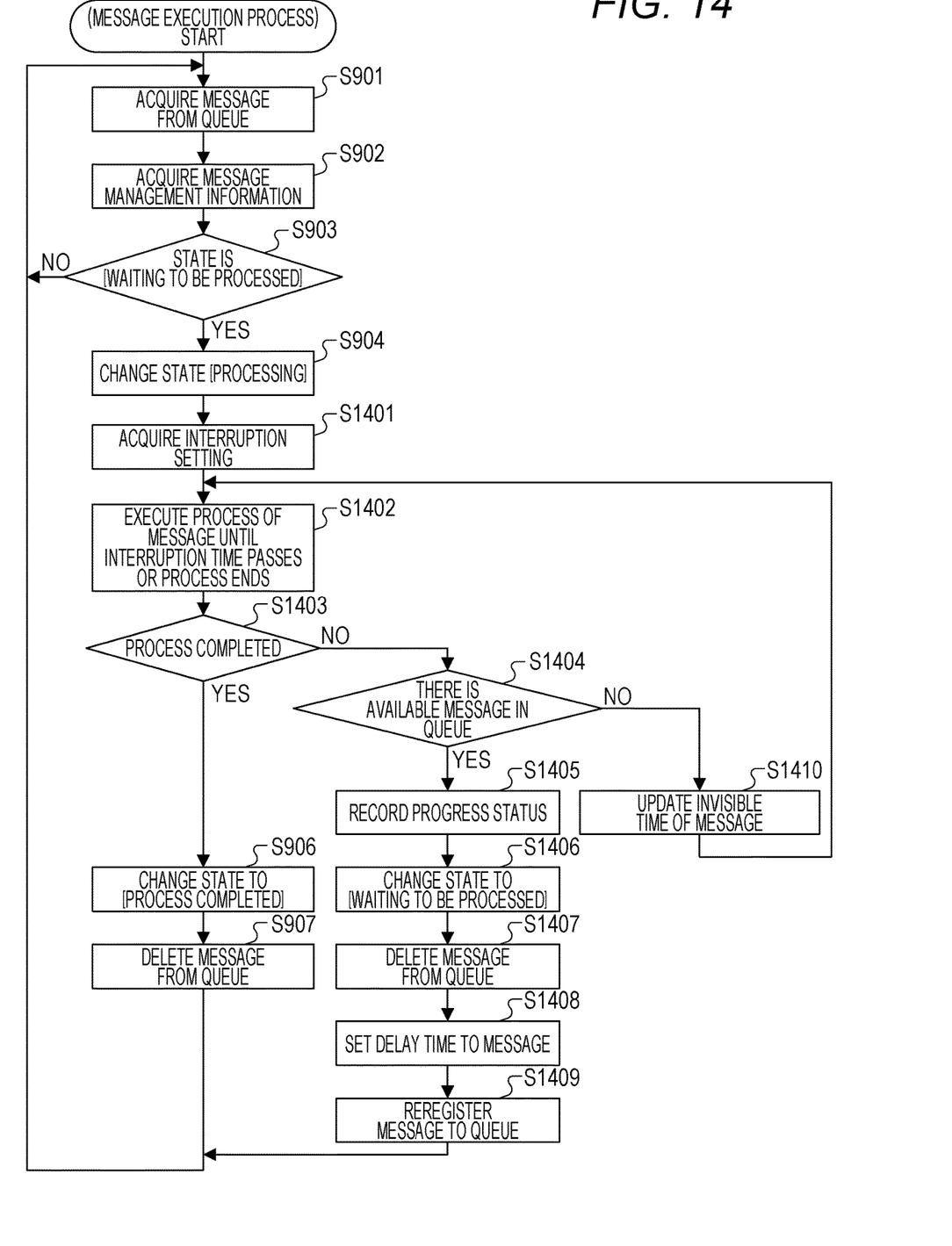
FIG. 14 is a flowchart illustrating an example of a procedure of a message execution process according to the second embodiment.

FIG. 14 is a flowchart illustrating an example of a procedure of a message execution process executed by the message execution server 107 according to the second embodiment. This process is a process, which expands the message execution process illustrated in FIG. 9 according to the first embodiment. In this process, when the process is not completed after a predetermined period of time since an execution of a process of the message is started, the process is interrupted. Then, the progress status of the process at the timing of the interruption is registered and the message is reregistered to the queue. Then, a subsequent message is acquired from the queue and a subsequent process is executed. With this, even when the process is undividable, the message execution server is prevented from being occupied by a process of a particular message and the message can be processed efficiently.

The processes S901 to S904 are the same as what is described in the first embodiment.

In S1401, the execution unit 402 acquires interruption setting corresponding to the process instructed by the message, which is acquired in S901.

Next, in S1402, the execution unit 402 executes the process instructed by the message, which is acquired in S901. Here, the execution unit 402 judges the process content and executes the process based on the message content illustrated in FIG. 7 and the progress status 1201 acquired in S902. The execution unit 402 uses the message ID of the acquired message and, when the progress status 1201 is registered, determines to executed the process from what is left in the previous execution. Further, when an interruption time passes after the process instructed by the message is started or when the process completes before the interruption time 1102 passes, the execution unit 402 processes the process in S1403.

Next, in S1403, the execution unit 402 judges whether or not the process executed in S1402 is completed. Here, when the execution unit 402 judges that the process has been completed, the process proceeds to S906. On the other hand, when the execution unit 402 judges that the process has not completed (the process has been interrupted since the interruption time has passed), the process proceeds to S1404.

The processes in S906 and S907 are same as what is described in the first embodiment.

In S1404, the execution unit 402 confirms whether or not there is an available message in the queue. Here, when there is an available message in the queue, the process proceeds to S1405. On the other hand, when there is not an available message in the queue, the process proceeds to S1410.

Next, in S1405, the execution unit 402 registers the progress status of the process in S1402 to the progress status 1201 in the message management information.

Next, in S1406, the execution unit 402 changes the state information 604 of the message acquired in S901 to "Waiting to be processed."

Next, in S1407, the deletion unit 403 deletes the message acquired in S901 from the queue.

Next, in S1408, the registration unit 1001 sets a predetermined delay time to the message acquired in S901. When the queue to be used is a distributed queue, due to the nature of the queue, the order of the messages in the queue (the firstly registered message can be acquired at first) is maintained as possible; however, it may not be guaranteed. When the queue has such a nature, by setting the delay time to the message, another message can be easily acquired firstly during the delay time. It may be considered that a delay time set in this process is sufficient when it is set to around ten seconds for purposes.

Next, in S1409, the registration unit 1001 registers a message, which is acquired in S901 and to which the delay time is set in S1408, to the queue, the process returns to S901 and another message is processed.

On the other hand, in S1410, when the execution unit 402 updates an invisible time of the message, which exists in the queue and is acquired in S901, the process returns to S1402 and the process of the current message is restarted. When there is not an available message (no process in a waiting state) in the queue, since it is not needed to interrupt the current process to process another message, it is controlled to continue the process of the current message. When the process of the current message is continued, the process time of a single message becomes longer than the original length. Thus, the invisible time of the message in the queue may pass and the state may become a visible state (a state available to another server). Thus, the invisible time is updated to be longer in this process. As a value when the invisible time is updated, it is considered that a value same as the value set to the existing message is used.

Here, in S1407, the deletion unit 403 does not have to instruct to delete the message acquired in S901 from the queue 106. After that, the message execution server may be able to acquire and process another message until the invisible time set to the queue 106 or the message passes. Then, the message becomes in a visible state after the invisible time of the message has passed, the message execution server can acquire the message and restart the process based on the progress status 1201.

Further, when the process of the message by the execution unit 402 is interrupted, the execution unit 402 newly generates a message for the remained process, and the registration unit 1001 may register the message to the queue. Further, when the process of the message by the execution unit 402 is interrupted, the original message may be divided and the registration unit 1001 may register the divided messages to the queue. In these cases, the execution unit 402 may not have to always register the progress status of the process of the message to the data store 108.

<Case that Priority Queue Exists>

Among the processes executed by the information processing system, there is a process executed according to instructions from both of the user and the scheduler. Regarding such a process, when an execution instruction from the user is received immediately after the execution instruction from the scheduler, the process instructed from the user is executed after a completion of the regularly-scheduled process instructed from the scheduler. Accordingly, there is a problem that the time that the user is kept waiting until the process is completed dramatically differs depending on whether it is in the time zone of the regularly-scheduled process by the scheduler. As a mechanism to solve the problem, there is a method that uses two queues of a priority queue and a normal queue. To the priority queue, a message to which a priority is given over the message registered in the normal queue can be registered.

Figure 15:
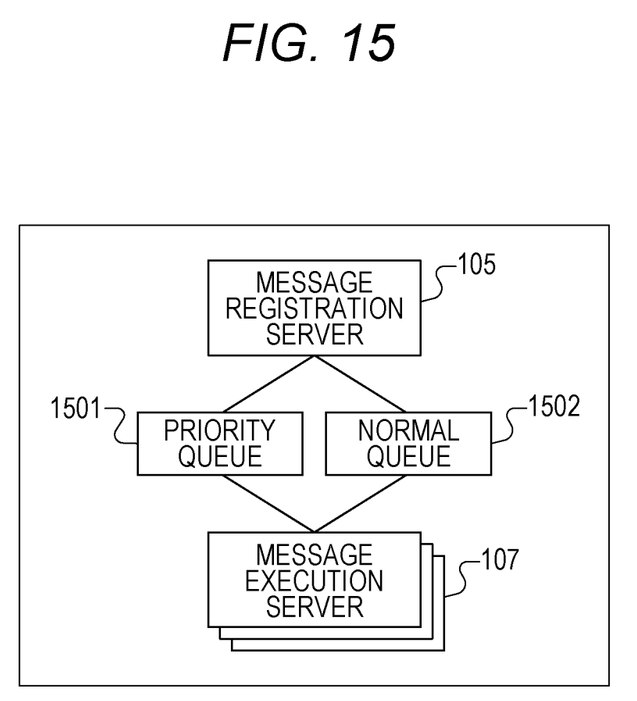
FIG. 15 is a schematic view illustrating a configuration including a priority queue and a normal queue.

FIG. 15 is a diagram illustrating an example of a case that the units 105 to 107 of the overall configuration illustrated in FIG. 1 is made to be a mechanism that uses a priority queue and a normal queue. When a message registration request is received from the web server 103, the message registration server 105 generates a message and registers the generated message to a priority queue 1501. On the other hand, when a message registration request is received from the scheduler 104, the message registration server 105 generates a message and registers the generated message to a normal queue 1502. The message execution server 107 acquires messages registered in the priority queue 1501 and normal queue 1502 and executes processes instructed by the messages. Here, the message execution server 107 acquires a message firstly from the priority queue. Then, when there is no message available in the priority queue, the message execution server 107 acquires a message from the normal queue. With this mechanism, the execution instruction from the user can be processed before an execution process from the scheduler.

When a mechanism that uses a priority queue and a normal queue is employed, the determination in S1404 illustrated in FIG. 14 is performed only for the priority queue. In other words, the execution unit 402 confirms whether or not there is an available message in the priority queue. Here, in a case that there is an available message in the priority queue, the process proceeds to S1405. On the other hand, in a case that there is no available message in the priority queue, the process proceeds to S1410. With this configuration, in a case that the user is not affected, the process is interrupted and a process to reregister the message is not performed, so that the messages can be processed efficiently.

According to the present embodiment, the message execution server interrupts the process of the message, registers a progress status of the process of the message to data store, sets a delay time to the message, and reregisters the message to the queue. According to the present embodiment, since the process of the message having a long process time can be interrupted, a different message can be inserted.

(Third Embodiment)

A third embodiment describes a method that combines the method illustrated in the first embodiment and the method illustrated in the second embodiment.

Among the processes executed by the information processing system, the processes can be divided but the process times of the respective divided processes may dynamically differ depending on the execution timing or user's usage condition. In a case of such a process, only with the first embodiment, there is a possibility that a process of a particular message may occupy a server more than expected. The third embodiment describes a mechanism that can efficiently process queue messages without having the server occupied by the process of a particular queue message even when there is a process having a greatly different process time among the respective divided processes Here, in the following, a part, which is different from the first embodiment, will be described.

<Function Framework of Message Execution Server>

The function framework of the message execution server is the same as the function framework illustrated in FIG. 10 in the second embodiment.

<Interruption Setting Table>

The interruption setting table has a configuration same as the configuration illustrated in FIG. 11 in the second embodiment.

<Message Management Table>

The message management table has a configuration same as the configuration illustrated in FIG. 12 in the second embodiment.

<Message Execution Process>

The message execution process has a flowchart same as the flowchart illustrated in FIG. 14 in the second embodiment. In this process, when the process of the message is started and is not completed after a predetermined period of time has passed, the process is interrupted. Then, a progress status of the process at the timing of interruption is recorded and the message is reregistered to the queue. Then, a next message is acquired from the queue, and the next process is executed. With this configuration, when a divided process takes a long period of time, the messages can be efficiently processed without having a message execution server occupied by a process for a particular message.

According to the present embodiment the queue messages may be efficiently processed without having a server occupied by a process of a particular queue message even when there is a process having a widely different process time among the respective divided processes.

(Fourth Embodiment)

A fourth embodiment describes a mechanism in which the respective processes illustrated in the first to third embodiments are selectively used. By selectively using the respective methods depending on a process, queue messages can be efficiently processed according to characteristics of various processes executed by the information processing system.

Here, in the following, a part different from the third embodiment will be described.

<Division Setting Table>

According to the fourth embodiment, in a case that a process is a process which is appropriate to be divided, among the various processes executed by the information processing system, division setting related to the process is registered. For example, the division setting is registered in this table, particularly, regarding a process applicable to parallel processing.

<Interruption Setting Table>

According to the fourth embodiment, among the various processes executed by the information processing system, the interruption setting is registered in this table, regarding a process to interrupt the process after a predetermined period of time in the message execution process. For example, the division setting is registered in this table, particularly, regarding a process appropriate to sequential processing, a process which cannot be divided, or a process having a widely different process time among the respective divided processes.

<Message Registration Process>

According to the fourth embodiment, regarding a process that division setting is registered in the division setting table, the message registration process illustrated in FIG. 8 is executed. Regarding a process that division setting is not registered in the division setting table, the message registration process illustrated in FIG. 13 is executed.

<Message Execution Process>

According to the fourth embodiment, regarding a process that interruption setting is registered in the interruption setting table, a message execution process illustrated in FIG. 14 is executed. Regarding a process that interruption setting is not registered in the interruption setting table, the message execution process illustrated in FIG. 9 is executed.

According to the present embodiment, by selectively using the method depending on the process, the queue messages can be efficiently processed, according to the characteristics of the various processes executed by the information processing system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-202963, filed Oct. 14, 2016, which is hereby incorporated by reference herein in its entirety.

What is claimed is:

1. A message execution system that executes a process based on a message, which is registered in a queue by a message registration system, the message execution system comprising:
a memory storing instructions; and
a processor executing the instructions to:
acquire the message from the queue;
execute the process based on the acquired message; and
register, to the queue, a message for executing a remained process based on the message which is interrupted when a predetermined period of time passes after the process based on the acquired message has started executing,
wherein, to the registered message, a delay time, which indicates a period of time to make the registered message unavailable from the queue, is set,
wherein a progress status of the process based on the acquired message is registered to a data store with an identifier of the acquired message, when the process based on the acquired message is interrupted, and
wherein the progress status of the message registered to the data store is confirmed by using the identifier of the acquired message when the message is acquired from the queue, and the remained process based on the message is executed according to the confirmed progress status.

2. The message execution system according to claim 1, wherein a message, which is different from the message of the remained process, is acquired from the queue during the delay time set to the registered message of the remained process, and
wherein a process based on the message is executed, the message being different from the acquired message of the remained process.

3. The message execution system according to claim 1, wherein the instructions further cause the message execution system to instruct to delete the acquired message from the queue,
wherein it is instructed to delete, from the queue, the message which is interrupted when a predetermined period of time passes after the process based on the acquired message has started executing.

4. The message execution system according to claim 1, wherein the interrupted message registered to the queue as a message of the remained process.

5. The message execution system according to claim 1, wherein the process based on the acquired message is interrupted according to setting stored in a data store which can be accessed by the message execution system, when the process based on the acquired message is not completed and when there is an available message left in the queue, in a case that a predetermined period of time passes after the process based on the acquired message has started executing, and
wherein the process based on the acquired message is continued according to the setting stored in the data store which can be accessed by the message execution system, when the process based on the acquired message is not completed and when there is no available message left in the queue, in a case that a predetermined period of time passes after the process based on the acquired message has started executing.

6. The message execution system according to claim 1, wherein the queue includes a normal queue and a priority queue which can store a message to be processed prior to a message registered in the normal queue,
wherein the process based on the acquired message is interrupted according to setting stored in a data store which can be accessed by the message execution sytem, when the process based on the acquired message is not completed and when there is an available message left in the priority queue, in a case that a predetermined period of time passes after the process based on the acquired message has started executing, and
wherein the process based on the acquired message is continued according to the setting stored in the data store which can be accessed by the message execution system, when the process based on the acquired message is not completed and when there is no available message left in the priority queue, in a case that a predetermined period of time passes after the process based on the acquired message has started executing.

7. The message execution system according to claim 1, wherein data of a client using an information processing system including the message registration system and the message execution sytem is managed in an area dedicated to the client,
wherein the message registration system receives a request from a second client, who is different from a first client as a sender of a request corresponding to the executed message,
wherein a message corresponding to the request received from the second client is registered to the queue, and wherein the message corresponding to the request received from the second client is acquired before reacquiring the interrupted message corresponding to the request received from the first client, in a case that the process of the message corresponding to the request received from the first client is interrupted.

8. A control method of a message execution system that executes a process based on a message, which is registered in a queue by a message registration system, the control method comprising:

acquiring a message from the queue;

executing a process based on the acquired message; and registering, to the queue, a message for executing a remained process based on the message which is interrupted when a predetermined period of time passes after the process based on the acquired message has started executing, wherein to the registered message, a delay time, which indicates a period of time to make the registered message unavailable from the queue, is set, wherein a progress status of the process based on the acquired message is registered to a data store with an identifier of the acquired message, when the process based on the acquired message is interrupted, and wherein the progress status of the message registered to the data store is confirmed by using the identifier of the acquired message when the message is acquired from the queue, and the remained process based on the message is executed according to the confirmed progress status.

9. A control method of a message execution system that executes a process based on a message, which is registered in a queue by a message registration system, the control method comprising:

acquiring the message from the queue;

executing the process based on the acquired message;

interrupting the process based on the acquired message when a predetermined period of time passes after the process based on the acquired message has started to be executed; and registering, to the queue, a message for executing a remained process based on the message of which the process has been interrupted.

* * * * *